United States Patent [19]
Müller et al.

[11] Patent Number: 6,156,244
[45] Date of Patent: Dec. 5, 2000

[54] STORAGE-STABLE HYDROGELS

[75] Inventors: Achim Müller, Aschaffenburg, Germany; Beat Müller, Marly, Switzerland; Bernhard Seiferling, Goldbach; Iris Leder, Niedernberg, both of Germany

[73] Assignee: Novartis AG, Basel, Switzerland

[21] Appl. No.: 09/180,588

[22] PCT Filed: May 15, 1997

[86] PCT No.: PCT/EP97/02477

§ 371 Date: Nov. 12, 1998

§ 102(e) Date: Nov. 12, 1998

[87] PCT Pub. No.: WO97/44687

PCT Pub. Date: Nov. 27, 1997

[30] Foreign Application Priority Data

May 23, 1996 [DE] Germany ............................ 96810330

[51] Int. Cl.⁷ ................... C08F 8/12; B29D 11/00
[52] U.S. Cl. ................... 264/2.6; 525/62; 525/327.8; 525/56; 523/106
[58] Field of Search .................. 264/1.1, 1.36, 264/1.38, 2.6; 525/56, 61, 62, 327.8; 523/106; 524/803

[56] References Cited

U.S. PATENT DOCUMENTS

| | | |
|---|---|---|
| 3,221,083 | 11/1965 | Crandon . |
| 5,407,062 | 4/1995 | Shannon et al. . |
| 5,508,317 | 4/1996 | Muller ........................................ 264/1.1 |
| 5,583,163 | 12/1996 | Muller . |

FOREIGN PATENT DOCUMENTS

| | | |
|---|---|---|
| 0 473 553 A3 | 8/1991 | European Pat. Off. . |
| 0 637 490 A1 | 7/1994 | European Pat. Off. . |
| 0 641 806 A2 | 7/1994 | European Pat. Off. . |
| WO 95/32440 | 11/1995 | WIPO . |

*Primary Examiner*—Mathieu D. Vargot
*Attorney, Agent, or Firm*—R. Scott Meece; Robert J. Gorman, Jr.

[57] ABSTRACT

The present invention relates to a process for the preparation of storage-stable hydrogel mouldings, the storage stability of which can be established by controlled hydrolysis. At the same time as the sotrage stability is established, the hydrogel is sterilised in its final packaging, and the salt concentration of the aqueous phase is adjusted preferably to a physiological range.

35 Claims, No Drawings

STORAGE-STABLE HYDROGELS

The present invention relates to a process for the preparation of hydrogels that contain hydrolysable side groups and the storage stability of which can be established by controlled hydrolysis. At the same time as the storage stability is established, the hydrogel is sterilised in its final packaging, the salt concentration of the aqueous phase being adjusted preferably to a physiological range.

In the commercial preparation of hydrogels, for example by crosslinking polymers in solution, in order for the process to be economical certain physicochemical properties are required of the starting polymers in respect of, for example, viscosity, crystallisation tendency, solubility and chemical reactivity. Those properties can be positively influenced by using special side groups in a polymer. It is of advantage for an economic process to employ side groups that are used on a large commercial scale and that are favourably priced, but a disadvantage is that such side groups are not always sufficiently stable for the purpose for which the hydrogel is intended.

It is known, for example, that the viscosity of a Mowiol solution (aqueous solution of a partially hydrolysed polyvinyl alcohol, Hoechst AG) is dependent on the one hand on the degree of polymerisation and degree of hydrolysis of the polymer, and on the other hand on the concentration and the temperature (see, for example, the Hoechst AG booklet "Profil eines Polymeren, Polyvinylalkohol Mowiol" (Profile of a polymer, Mowiol polyvinyl alcohol), 1991). If the degree of polymerisation is kept constant, then a solution of a fully hydrolysed polyvinyl alcohol (PVA) will have a higher viscosity than a solution of a partially hydrolysed polyvinyl alcohol. Furthermore, the polarity of the PVA building blocks causes so-called association phenomena, which occur especially in the higher concentration range of fully hydrolysed high- and low-molecular-weight Mowiol types. The result is so-called gelling effects, which render efficient processing difficult and also make commercial processes, for which a high viscosity is prohibitive, impossible.

The present invention relates to hydrogels, especially hydrogels based on crosslinkable polyvinyl alcohols modified by hydrolysable side groups, the storage stability of which hydrogels can be established in a simple process. The invention also relates to a procedure by which, at the same time as the storage stability of the hydrogel is established, the hydrogel can be sterilised in its final packaging and the salt concentration of the aqueous phase can be set in the physiological range.

Hereinbefore and hereinafter, storage stability also signifies dimensional stability and/or mechanical stability, for example of a moulding or especially of a contact lens.

As a result of the present invention it is possible in the preparation of storage-stable hydrogels to use especially PVA prepolymers, which offer advantages in terms of processing technology, such as low viscosity and good processing stability of the prepolymer solution (see in this connection the above-mentioned association phenomena of PVA), but the use of which has not been possible hitherto on account of their lack of stability in respect of hydrolysis and their resultant lack of stability in storage. Furthermore, the mechanical properties of a crosslinked prepolymer, and hence of the hydrogel, can be regulated not only by way of the network density but also by means of the side groups of the prepolymer used.

Accordingly, a hydrogel moulding of the present invention is produced preferably from a PVA prepolymer of which the physicochemical properties have been positively modified by hydrolytically removable side groups. In a process step following the crosslinking, the side groups are hydrolytically removed without there being any significant alteration to the mechanical properties of the hydrogel. The moulding assumes its final geometry in that process step. The process step may preferably proceed in such a manner that the moulding is simultaneously hydrolysed and sterilised in its final packaging, resulting in a moulding that is packed in storage-stable and sterile manner in a physiological salt solution.

Within the context of the present invention, "moulding" signifies a moulding that consists substantially and preferably of a hydrogel. The hydrogel is more preferably one that is especially suitable for use as a contact lens material. A strongly preferred hydrogel material is derived from polyvinyl alcohol (PVA).

The present invention accordingly relates to a process for the manufacture of storage-stable hydrogel mouldings, especially contact lenses, that comprises the following steps:

a) transferring a hydrogel moulding that contains hydrolytically removable side groups to a container, b) filling up the container containing the hydrogel moulding with a basic buffer solution, c) closing the container, and e) autoclaving the container containing the hydrogel moulding and the basic buffer solution at a temperature of at least 100° C., wherein, during the autoclaving, the hydrolytically removable side groups are essentially completely removed, the container contents are sterilised, and the basic buffer solution is converted into a physiologically acceptable aqueous solution that is substantially isotonic and pH-compatible with the lacrimal fluid of the human eye.

As mentioned above, a hydrogel moulding is preferably of a material that is derived especially from polyvinyl alcohol (PVA). Preference is given more especially to the use of hydrogels that are derived from a crosslinkable and water-soluble (not yet crosslinked) PVA prepolymer.

PVA is usually obtained by hydrolysis of a corresponding homopolymeric polyvinyl acetate, polyvinyl propionate or polyvinyl butyrate, generally of a polyvinyl alkanoate, preferably of a polyvinyl lower alkanoate or of a mixture thereof or of a mixture comprising a copolymer of a polyvinyl alkanoate with a suitable comonomer. Preferred polyvinyl alkanoates are polyvinyl acetate, polyvinyl propionate and mixtures thereof. A strongly preferred polyvinyl alkanoate is polyvinyl acetate. The hydrolysis of such polyvinyl alkanoates typically results in PVA types having a residual content of polyvinyl alkanoate of approximately from 0.8 to 15 mol %, preferably from 2 to 10 mol % and especially from 5 to 10 mol %. The residual content of alkanoate is generally constituted by an above-mentioned removable side group that on the one hand can positively modify the physicochemical properties, for example of a non-crosslinked prepolymer, and that on the other hand can be removed hydrolytically.

Suitable above-mentioned comonomers are, for example, ethylene, propylene, acrylamide, methacrylamide, dimethyl acrylamide, hydroxyethyl methacrylamide, methyl methacrylate, methyl acrylate, ethyl acrylate, N-vinylpyrrolidone, hydroxyethyl acrylate, allyl alcohol and styrene. A suitable comonomer may typically be present in an amount of up to approximately 20% by weight, and preferably up to approximately 5% by weight.

A hydrolysis step in which a side group is removed is especially distinguished by the fact that the mechanical properties of the hydrogel are not substantially altered. However, the moulding generally assumes its final geometry in that process step. The process step may preferably proceed in such a manner that the moulding is simultaneously hydrolysed and sterilised in its final packaging, resulting in a moulding that typically is packed in a storage-stable and sterile manner in physiological salt solution. In a preferred embodiment the moulding is a contact lens.

The process step typically comprises, after preparing a hydrogel, for example by photochemical crosslinking, packing the hydrogel, for autoclaving, in an aqueous basic solution of a concentration and volume appropriate to the quantity of the hydrogel. Autoclaving then typically follows, which is carried out, for example, preferably at 121° C. for a period appropriate to the rate of the hydrolysis. During the autoclaving the hydrogel is generally sterilised, and the side groups are generally completely hydrolysed. The acid freed during the hydrolysis, which typically is produced by removal of a side group, forms with the preferably basic hydrolysis solution a buffer mixture of which the pH value, osmolarity and composition are preferably within a physiologically acceptable range.

The PVA prepolymers preferably used may typically be crosslinked in a targeted and extremely effective manner, especially by photocrosslinking.

Suitably, in the photocrosslinking process, a photoinitiator that is able to initiate radical crosslinking is added. Examples of photoinitiators are familiar to the person skilled in the art, but suitable photoinitiators that may be mentioned specifically are benzoin methyl ether, 1-hydroxycyclohexylphenylketone or Irgacure types, for example Irgacure® 1173. The crosslinking may then be triggered by high-energy radiation, for example UV light of a suitable wavelength, or ionising radiation, for example gamma radiation or X-ray radiation.

The photocrosslinking is suitably carried out in a solvent. Suitable solvents are in principle any solvents that dissolve polyvinyl alcohol or a prepolymer used, for example water, alcohols, such as lower alkanols, for example methanol, polyols, for example glycerol, glycol or polyethylene glycol, amines, for example ethanolamine or diethylenetriamine, also carboxylic acid amides, such as dimethylformamide (DMF), dipolar aprotic solvents, for example dimethyl sulfoxide, N-methylpyrrolidone (NMP), and also mixtures of suitable solvents, for example mixtures of water with a carboxylic acid amide or with an alcohol, for example a water/methanol mixture.

The photocrosslinking, especially of PVA prepolymers, is effected preferably directly from an aqueous solution of a mentioned prepolymer, which can be obtained, for example, as already described in EP 641 806, as a result of a preferred purification step, namely, for example, ultrafiltration. For example it is possible for an approximately 15 to 40% aqueous solution to be photocrosslinked.

"Crosslinking" within the context of the present invention is to be understood phenomeno-logically as any kind of reaction in which a material is converted, typically by polymerisation of a water-soluble prepolymer, into a water-insoluble state in which it retains its shape as defined by the mould cavity (for example as a moulding).

Also, the duration of a crosslinking reaction, especially a photocrosslinking reaction of a PVA prepolymer the use of which is preferred, is typically in the range of from approximately 1 second to approximately 2 minutes, preferably in the range of approximately from 1 to 60 seconds and especially in the range of approximately from 1 to 30 seconds. After that period of time a moulding or a contact lens typically assumes a definite and stable shape, as explained above. That criterion accordingly typically determines the residence time of a moulding in the mould. After that, however, crosslinking may spontaneously increase or intensify until the final degree of crosslinking is achieved, but this generally has no further bearing on the residence time of a moulding in a mould.

Preference is given especially to water-soluble PVA prepolymers distinuished by side groups that do not form toxic products during the hydrolysis and that have polymer chains of adequate hydrolytic stability, a prepolymer signifying especially a PVA prepolymer or a PVA prepolymer derived therefrom.

Non-toxic side groups in the sense of having excellent compatibility with the human eye and the human organism are, for example, acetate or propionate groups. It is also possible, however, to use mixtures of side group representatives. The side groups may furthermore be modified by transesterification so that further esters of acids, especially physiologically acceptable acids, may be used. Such acids are preferably monobasic acids. A few typical examples may be mentioned, namely: salicylic acid, benzoic acid, nicotinic acid and lactic acid.

Preference is given to the use, for example, of a prepolymer of a modified polyvinyl alcohol having a mean molecular weight of at least approximately 2000 which, based on the number of hydroxyl groups of the polyvinyl alcohol, contains from approximately 0.5 to approximately 80% units of formula (I)

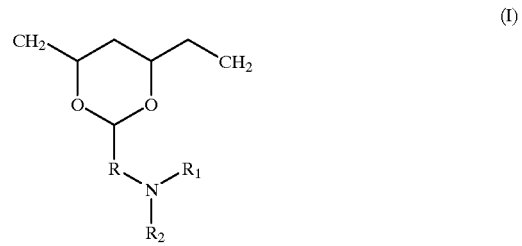

(I)

wherein

R is lower alkylene having up to 8 carbon atoms, $R_1$ is hydrogen or lower alkyl and $R_2$ is an olefinically unsaturated, electron-attracting, copolymerisable radical preferably having up to 25 carbon atoms.

$R_2$ is typically an olefinically unsaturated acyl radical of the formula $R_3$—CO— wherein $R_3$ is an olefinically unsaturated copolymerisable radical having from 2 to 24 carbon atoms, preferably from 2 to 8 carbon atoms, or especially from 2 to 4 carbon atoms. In another embodiment the radical $R_2$ is a radical of formula 11

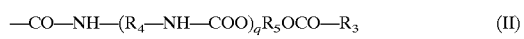

—CO—NH—$(R_4$—NH—COO$)_q R_5$OCO—$R_3$ (II)

wherein q is zero or one and $R_4$ and $R_5$ are each independently of the other lower alkylene having from 2 to 8 carbon atoms, arylene having from 6 to 12 carbon atoms, a saturated divalent cycloaliphatic group having from 6 to 10 carbon atoms, arylenealkylene or alkylene-arylene having from 7 to 14 carbon atoms or arylenealkylenearylene having from 13 to 16 carbon atoms, and wherein $R_3$ is as defined above.

The prepolymers according to formula (I), the crosslinked prepolymers or hydrogels, and also the processes for their preparation and their use are known and are described in detail in EP 641 806 (Ciba-Geigy).

The PVA basic structure of a prepolymer used still contains amounts of side groups that are derived preferably from 0.8 to 15 mol % and especially from 2 to 10 mol % polyvinyl acetate, polyvinyl propionate and/or mixtures thereof. Amounts in the range from 5 to 10 mol % polyvinyl acetate are strongly preferred.

An essential component of the basic and, preferably, aqueous hydrolysis solution is formed by the base. Suitable bases are in principle all inorganic or organic bases of acids, preferably weak acids, that after hydrolytic cleavage yield a buffer mixture having a pH value that lies within a range physiologically acceptable to the eye. Typical examples of inorganic bases are phosphate (for example sodium phosphate), monohydrogen phosphate, borate and carbonate. A typical example of an organic base is tris(hydroxymethyl)methylamine (TRIS). Strongly preferred as essential component is monohydrogen phosphate and/or phosphate.

Throughout the present invention, a basic hydrolysis solution is preferably aqueous and may typically comprise, in addition to a base, a tonicity enhancer. A tonicity enhancer is generally used to set approximately the osmolarity of a basic buffer solution before the autoclaving. A tonicity enhancer is, for example, an ionic compound, such as an alkali metal or alkaline earth metal halide, for example $CaC_2$, KBr, KCl, LiCl, NaI, NaBr, NaCl or boric acid. A non-ionic tonicity enhancer is, for example, urea, glycerol, sorbitol, mannitol, propylene glycol or dextrose. A strongly preferred ionic tonicity enhancer is NaCl.

In a strongly preferred embodiment, a PVA hydrogel moulding of a prepolymer according to formula (I) having acetate groups as side groups is used, which may be reacted in an autoclaving step with a solution of $Na_2HPO_4$ and NaCl to form hydrolysis- and storage-stable mouldings, especially contact lenses. The freed acetic acid and the $Na_2HPO_4$ form a buffer mixture having a pH value of approximately 7.3. As a result of the formation of the buffer the system is insensitive to dioptre-related changes in the mass of the contact lenses.

The invention relates also to a process in which it is possible under autoclaving conditions (initial pH value, time and temperature) for a moulding (hydrogel) to be freed, generally completely, of hydrolysable side groups, and thus for a storage-stable product to be obtained.

The initial pH value of a basic buffer solution is preferably in the range from pH 8 to 12, more preferably in the range from pH 8.5 to 11, and especially in the range from pH 9 to 10.

Hereinbefore and hereinafter "autoclaving" is always used to mean thermal treatment in a closed vessel under pressure and typically with the introduction of steam at a temperature of at least 100° C. "Autoclaving" is used especially to mean sterilisation.

The temperature range in which the autoclaving is carried out is preferably from 101 to 150° C., with the range from 110 to 130° C. being especially preferred and the range from 115 to 125° C. being more especially preferred.

The period of time required for an autoclaving step is generally in the range from approximately 5 minutes to approximately 18 hours, preferably in the range from approximately 15 minutes to approximately 8 hours and especially in the range from approximately 20 minutes to approximately 120 minutes.

After the autoclaving step, the osmolarity of the aqueous solution in a packaging is from approximately 220 to approximately 450 mosmol, preferably from approximately 250 to approximately 400 mosmol and especially from approximately 280 to approximately 400 mosmol.

Also, the pH value after the autoclaving step is approximately from pH 6 to 8, and especially from pH 6.8 to 7.6.

The invention relates also to a process in which the hydrolysis can be carried out in the primary packaging of the product, which renders possible simultaneous sterilisation of the product and gives a physiologically acceptable salt concentration.

The invention relates also to a process in which the hydrolysis can be carried out in the primary packaging of the product, which renders possible simultaneous sterilisation of the product and gives a physiologically acceptable salt concentration and a physiologically acceptable pH.

The invention relates also to a process in which the mechanical properties of a moulding (hydrogel) (based on the chemical structure and the network density of the hydrogel) remain substantially unaltered after a hydrolysis as described above.

The invention relates also to a polypropylene packaging having an aluminium sealing foil, which contains a sterilised moulding, especially a contact lens, in a ready-to-use aqueous solution that is isotonic and pH-compatible with the lacrimal fluid of the human eye.

A material the use of which is preferred is a prepolymer of a polyvinyl alcohol having a mean molecular weight of at least approximately 2000 which, based on the number of hydroxyl groups of the polyvinyl alcohol, contains from approximately 0.5% to approximately 80% units of formula (III)

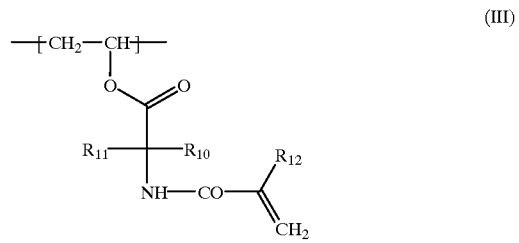

wherein $R_{10}$ and $R_{11}$ are each independently of the other amino, hydrogen, unsubstituted or substituted lower alkyl having up to 8 carbon atoms, aryl or cycloalkyl, and $R_{12}$ is hydrogen or lower alkyl having up to 4 carbon atoms and is especially methyl.

Also preferred is a prepolymer of a modified polyvinyl alcohol having a molecular weight of at least approximately 2000 which, based on the number of hydroxyl groups of the polyvinyl alcohol, contains from approximately 0.5 to approximately 80% units of formulae IV and V, V and VI or IV, V and VI

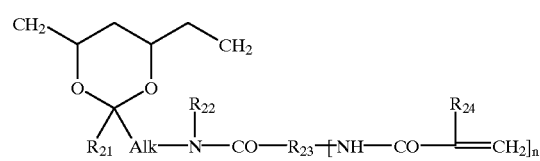

wherein Alk is alkylene having up to 12 carbon atoms, $R_{21}$ is hydrogen, alkyl or cycloalkyl, and $R_{22}$ is hydrogen or lower alkyl, $R_{23}$ is a

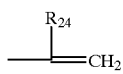

group when n=0 or is a

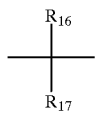

group when n=1, $R_{24}$ is hydrogen or lower alkyl, n=0 or 1 and preferably is 0, $R_{16}$ and $R_{17}$ are each independently of the other hydrogen, lower alkyl, aryl or cycloalkyl;

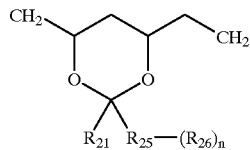
(V)

wherein $R_{21}$ is as defined above, $R_{25}$ is lower alkyl or lower alkenyl when n=0; lower alkylene or lower alkenylene when n=1, n=0 or 1, $R_{26}$ is a group of formula —(NH—CO—$R_7$)$_o$($R_8$)$_p$ or —N($R_9$)$_2$, $R_7$ is lower alkyl (when p=0) or lower alkylene (when p=1), $R_8$ is a heterocyclic group, $R_9$ is hydrogen or lower alkyl, and o and p are each independently of the other 0 or 1;

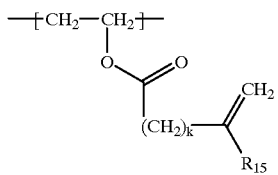
(VI)

wherein $R_{15}$ is hydrogen or lower alkyl having up to 4 carbon atoms and is especially methyl, and k is a value from 0 to 6, and is preferably 0.

Preference is given also to a prepolymer of a modified polyvinyl alcohol having a molecular weight of at least approximately 2000 which, based on the number of hydroxyl groups of the polyvinyl alcohol, contains from approximately 0.5 to approximately 80% units of formulae (I), (IIIa), (IV), (V), (VI) and/or (VII) in any combination

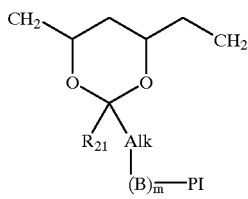
(VII)

wherein $R_{21}$ is hydrogen, alkyl or cycloalkyl,

Alk is alkylene having up to 12 carbon atoms,

B is a nitrogen-containing divalent group, m=0 or 1, and

Pl is generally a photoinitiator radical, especially a photoinitiator radical of formula (VIII)

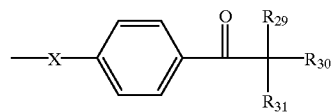
(VIII)

wherein X is —O—, —S— or —N($R_{32}$)—, $R_{32}$ is hydrogen or lower alkyl having up to 4 carbon atoms, $R_{29}$ is lower alkyl, lower alkoxy, cycloalkyl, a heterocyclic ring or alkenyl, $R_{30}$ is hydroxy, lower alkoxy, aryl or —N$R_{33}R_{34}$ wherein $R_{33}$ and $R_{34}$ are each independently of the other lower alkyl, or wherein $R_{33}$ and $R_{34}$ together form a 5- or 6-membered heterocyclic ring, $R_{31}$, independently of $R_{29}$ has the same meaning as $R_{29}$, or $R_{29}$ and $R_{31}$ together form 5- or 6-membered cycloalkyl.

A nitrogen-containing divalent group B is, for example, —NH—CO—(CH$_2$)$_x$- wherein x is from 1 to 6; —N($R_a$)—(CH$_2$)$_y$- wherein $R_a$ is hydrogen or alkyl having up to 12 carbon atoms and y is from 2 to 6; or B may be a quaternary ammonium salt of formula (VIIa)

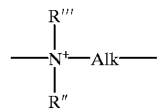
(VIIa)

wherein R" is hydrogen, alkyl, —Alk—PI, —CO—R"" wherein R"" is lower alkyl that may be substituted by —COOH or by acrylamide, or is lower alkenyl, R'" is hydrogen, or is lower alkyl provided that R" is not —COR"", and the remaining variables, such as Alk and Pl, are as defined hereinbefore.

A typical photoinitiator radical Pl of formula (VIII) has already been described in EP 632 329 (Ciba-Geigy). The preferred embodiments therein are accordingly also embodiments that are preferably used here.

Preference is given also to a prepolymer of a modified polyvinyl alcohol having a mean molecular weight of at least approximately 2000 which, based on the number of hydroxyl groups of the polyvinyl alcohol, contains from approximately 0.5 to approximately 80% units of formulae (IX), (X) and (XII), (IX) and (X) or (IX) and (XII)

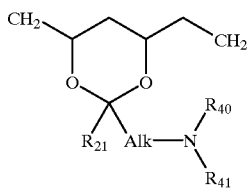
(IX)

wherein Alk is alkylene having up to 12 carbon atoms, $R_{40}$ is hydrogen or lower alkyl, $R_{41}$ is an olefinically unsaturated, electron-attracting, crosslinkable radical having up to 25 carbon atoms, and preferably each independently of the other is as defined for the radical $R_2$ in formula (I), and $R_{21}$ is hydrogen, alkyl or cycloalkyl;

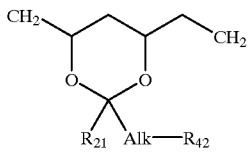
(X)

wherein Alk and $R_{21}$ are as defined above, $R_{42}$ is a primary, secondary or tertiary amino group or is a quaternary radical of formula (XI)

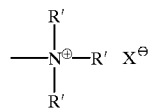
(XI)

wherein each R' independently of the others is hydrogen or lower alkyl having up to 4 carbon atoms, and $X^-$ is an anion, especially a halide, for example a fluoride, chloride, bromide or iodide;

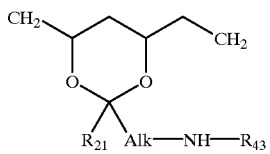
(XII)

wherein $R_{21}$ and Alk are as defined above and $R_{43}$ is a radical of a monobasic, dibasic or tribasic, saturated or unsaturated, aliphatic or aromatic organic acid or sulfonic acid.

Preference is given also to a prepolymer of a modified polyvinyl alcohol having a mean molecular weight of at least approximately 2000 which, based on the number of hydroxyl groups of the polyvinyl alcohol, contains from approximately 0.5 to approximately 80% units of formulae (XIII) and (XIV), (XIII) and (XV), or (XIII), (XIV) and (XV)

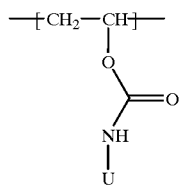
(XIII)

wherein U is a radical of the formula

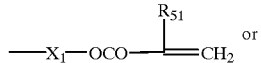
or

—Y—NHCOO—Z—O—CH=CH$_2$ wherein $X_1$ is alkylene having from 2 to 12 carbon atoms and especially from 2 to 6 carbon atoms, $R_{51}$ 1 is hydrogen or lower alkyl having up to 4 carbon atoms, Y is a divalent radical having from 7 to 12 carbon atoms and is especially cycloaliphatic or aromatic, and Z is $C_2$—$C_{12}$alkylene that may be interrupted by one or more oxygen atoms;

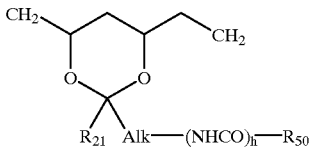
(XIV)

wherein Alk is alkylene, h=0 or 1, $R_{21}$ is hydrogen, alkyl or cycloalkyl, and $R_{50}$ is a monovalent organic group having from 1 to 18 carbon atoms, and is especially alkyl, cycloalkyl, aryl or a heterocyclic group;

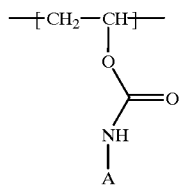
(XV)

wherein A is a monovalent organic radical having from 1 to 18 carbon atoms and is especially aryl, alkyl, cycloalkyl or a heterocyclic group.

As already mentioned at the beginning, the polyvinyl alcohols used hereinbefore and hereinafter may also contain small amounts, typically up to 20% by weight, preferably up to 5% by weight, of copolymer units of ethylene, propylene, acrylamide, methacrylamide, dimethylacrylamide, hydroxyethyl methacrylamide, methyl methacrylate, methyl acrylate, ethyl acrylate, vinyl pyrrolidone, hydroxyethyl acrylate, allyl alcohol, styrene or similar customarily used comonomers.

A material the use of which is strongly preferred is, for example, a prepolymer that is a derivative of a polyvinyl alcohol having a mean molecular weight of at least approximately 2000 which, based on the number of hydroxyl groups of the PVA, contains from approximately 0.5 to approximately 80%, especially from approximately 1 to approximately 15%, units of formula (I)

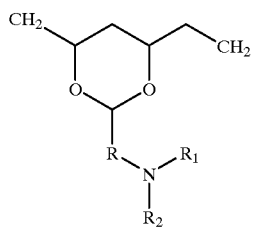

wherein R is lower alkylene having up to 8 carbon atoms, $R_1$ is hydrogen or lower alkyl and $R_2$ is an olefinically unsaturated acyl radical of the formula $R_3$—CO— wherein $R_3$ is an olefinically unsaturated copolymerisable radical having from 2 to 4 carbon atoms.

An olefinically unsaturated copolymerisable radical $R_2$ having from 2 to 24 carbon atoms is alkenyl and preferably is lower alkenyl, the group —CO—$R_3$ being especially the acyl radical of an acrylic or methacrylic acid.

Within the context of this invention, unless defined otherwise "lower" referring to radicals and compounds denotes especially radicals or compounds having up to 8 carbon atoms, preferably up to 6 and especially up to 4 carbon atoms.

Alkyl has up to 20 carbon atoms and may be straight-chain or branched. Suitable examples include decyl, octyl, hexyl, pentyl, neopentyl, n-butyl, sec-butyl, tert-butyl, isobutyl, propyl, ethyl and methyl.

Lower alkyl has especially up to 8 carbon atoms, preferably up to 6 and especially up to 4 carbon atoms, and is, for example, methyl, ethyl, propyl, butyl, tert-butyl, pentyl, hexyl, isohexyl or octyl.

Alkanoate has up to 20 carbon atoms and is the radical of a linear or branched alkanecarboxylic acid. Alkanoate is, for example, dodecanoate, butyrate or acetate.

Lower alkanoate has especially up to 8 carbon atoms, preferably up to 6 and especially up to 4 carbon atoms, and is, for example, butyrate, propionate or acetate.

Alkylene has up to 20 carbon atoms and may be straight-chain or branched. Suitable examples include decylene, octylene, hexylene, pentylene, butylene, propylene, ethylene, methylene, 2-propylene, 2-butylene and 3-pentylene.

Lower alkylene is alkylene having up to 8 and preferably having up to 6 and especially having up to 4 carbon atoms. Lower alkylene is especially propylene, ethylene or methylene.

Alkenyl is linear or branched alkenyl having from 2 to 20 carbon atoms and is, for example, undecenyl or dodecenyl.

Lower alkenyl is linear or branched alkenyl having from 2 to 8 carbon atoms, preferably from 2 to 6 carbon atoms and especially from 2 to 4 carbon atoms. Examples of alkenyl are vinyl, allyl, 1-propen-2-yl, 1-buten-2- or -3- or -4-yl, 2-buten-3-yl, and the isomers of pentenyl, hexenyl and octenyl Alkoxy has up to 20 carbon atoms and is, for example, nonyloxy or octyloxy.

Lower alkoxy has up to 8 carbon atoms, preferably up to 6 and especially up to 4 carbon atoms, and is, for example, methoxy, ethoxy, propoxy, butoxy or tert-butoxy.

A saturated divalent cycloaliphatic group has up to 20 carbon atoms, preferably up to 12 carbon atoms, and is preferably cycloalkylene, for example cyclohexylene, or cyclohexylene-lower alkylene, for example cyclohexylenemethylene, that is unsubstituted or substituted by one or more lower alkyl groups, for example methyl groups, such as, for example, trimethylcyclohexylenemethylene, for example the divalent isophorone radical.

Arylene has up to 24 carbon atoms, preferably up to 18 carbon atoms, and, unless defined otherwise, is preferably phenylene or naphthylene unsubstituted or substituted by lower alkyl or by lower alkoxy, especially 1,3-phenylene, 1,4-phenylene or methyl-1,4-phenylene, 1,5-naphthylene or 1,8-naphthylene.

Aryl has up to 24 and preferably up to 18 carbon atoms and is a carbocyclic aromatic compound that may be substituted by lower alkyl or by lower alkoxy. Examples are phenyl, tolyl, xylyl, methoxyphenyl, tert-butoxyphenyl, naphthyl and phenanthryl.

The arylene unit of alkylenearylene or arylenealkylene is preferably phenylene that is unsubstituted or substituted by lower alkyl or by lower alkoxy, and the alkylene unit thereof is preferably lower alkylene, such as methylene or ethylene, especially methylene. Preferably such radicals are therefore phenylenemethylene or methylenephenylene.

Arylenealkylenearylene is preferably phenylene-lower alkylene-phenylene having up to 8 and especially up to 6 and preferably up to 4 carbon atoms in the alkylene unit, for example phenyleneethylenephenylene or phenylenemethylenephenylene.

Within the context of the present invention, aryl-lower alkyl has up to 30, preferably up to 24 and especially up to 18 carbon atoms and is lower alkyl substituted by aryl. Examples of aryl-lower alkyl are benzyl, xylylmethyl, tolylethyl, phenylbutyl, tert-butoxyphenylmethyl, naphthylpropyl, methoxyphenylmethyl and phenylhexyl.

Cycloalkyl has preferably up to 12 carbon atoms and is, for example, cyclopentyl, cyclohexyl, cycloheptyl, methylcyclohexyl, 1,3-dimethylcyclohexyl, 1-methyl-4-isopropylcyclohexyl, 1,2-dimethylcyclopentyl or cyclooctyl.

A heterocyclic group has preferably up to 12 carbon atoms and is especially a 5- or 6-membered carbocyclic ring that is substituted, for example, by one or more hetero atoms of the following kind: —S—, —O—, —N= or —NH—. Typical examples are furan, thiophene, pyrrole, pyrrolidine, pyroglutamic acid, maleimide, coumarin, coumarone, indole, oxazole, isoxazole, thiazole, imidazole, triazole, tetrazole, pyran, pyridine, thiopyran, quinoline and uracil.

The Examples which follow serve to illustrate the present invention further, but are not intended to limit the scope thereof in any way. Temperatures, unless specified otherwise, are given in degrees Celsius. The term "saline", unless specified otherwise, denotes an approximately 0.9% by weight sodium chloride solution in water that is buffered to the preferred physiological pH range, that is pH 6.8 to 7.6.

EXAMPLE 1

Hydrolysis of polyvinyl alcohol hydrogel lenses having various acetate contents in basic solutions of varying hydrogen phosphate concentration.

From an aqueous prepolymer solution of a prepolymer according to formula (I) in which $R_1$=H and $R_2$=$R_3$—CO—, which has been obtained analogously to Example 15(i) of EP 641 806, the parameters being selected as follows (see also Table 1): solids content 30% by mass, having x mol % acetate groups (based on the repeating units)

and y mmol/g acrylamide groups (corresponding to the radical $R_2$ in formula (I)), contact lenses are produced in accordance with Example 15 of EP 641 806 by photochemical crosslinking in quartz glass moulds using a medium pressure mercury lamp. The contact lenses are autoclaved in 0.5 ml of $Na_2HPO_4$ solution (z mmol/l $Na_2HPO_4$) for 45 min. at 122° C. in a conventional PP packaging having an aluminium sealing foil. After autoclaving, the diameter and radius of curvature (base curve) of the contact lens and also the pH value and osmolarity of the autoclaving solution are determined. The contact lenses are subjected to an accelerated storage test at 80° C. (1 week). The diameter and radius of curvature (base curve) of the contact lens and the pH value and osmolarity of the autoclaving solution are then determined again.

In comparison thereto (No. 9) contact lenses are fully hydrolysed in 0.5 ml of 1 N aqueous NaOH at 121° C. over a period of 20 minutes. The amount of acetate removed is determined by back-titration of the NaOH solution. The amount of acetate found indicates hydrolysis exceeding 90%. In this case, too, the diameter and radius of curvature (base curve) of the contact lenses are determined.

As a further comparison, contact lenses are autoclaved in 0.5 ml of conventional saline (No. 10) and in 5.0 ml of conventional saline (No. 11) and then subjected to an accelerated storage test at 80° C. (1 week).

The results in Table 1 (No. 1 to No. 8) show that the contact lenses are storage-stable. A comparison between No. 8 and No. 9 shows that with an identical acrylamide and acetate content the changes in geometry occurring in the hydrolysis according to the invention and in the complete hydrolysis are of approximately the same magnitude (0.20 mm in diameter to 0.24 mm in diameter). The problem of storage stability is demonstrated in No. 10 and No. 11. With small volumes of storage solution (No. 10), there is a marked pH value reduction, whilst with large volumes of storage solution (No. 11) pronounced changes in geometry of the contact lenses occur during the storage.

According to ISO standard, the permissible deviations in geometry for contact lenses are +/−0.20 mm (diameter, base curve). The physiological range for storage solutions is from pH 6.8 to 7.8 and from 280 to 400 mosmol/kg. The changes in geometry occurring as a result of storage are, as shown in Table 1, No. 1 to No. 9, in all cases smaller than the maximum changes in geometry allowed according to ISO standard.

TABLE 1

Hydrolysis of polyvinyl alcohol hydrogel lenses having various acetate contents in basic solutions

| test number | | 1 | 2 | 3 | 4 | 5 | 6 | 7 | 8 | 9 | 10 | 11 |
|---|---|---|---|---|---|---|---|---|---|---|---|---|
| x mol % acetate | | 10 | 7 | 5 | 3 | 7 | 7 | 7 | 15 | 15 | 15 | 15 |
| y mmol/g acrylamide | | 0.46 | 0.48 | 0.45 | 0.47 | 0.51 | 0.48 | 0.48 | 0.52 | 0.52 | 0.52 | 0.52 |
| z mmol/l $Na_2HPO_4$ | | 135 | 135 | 135 | 135 | 135 | 100 e) | 80 b) | 370 | 1N NaOH | saline c) | saline d) |
| diameter | before autoclaving | 14.30 | 14.11 | — | 14.11 | — | 14.15 | 14.10 | 13.90 | 13.85 | — | — |
| | after autoclaving | 14.05 | 13.93 | 14.10 | 14.01 | 13.97 | — | 13.97 | 13.70 | 13.61 | 13.97 | 13.90 |
| | after storage a) | 13.98 | 13.9 | 14.10 | 14.03 | 13.87 | 13.9 | 13.9 | 13.61 | — | 13.89 | 13.63 |
| base curve | before autoclaving | 8.42 | 8.28 | — | 8.3 | — | 8.43 | 8.32 | 8.33 | 8.30 | — | — |
| | after autoclaving | 8.28 | 8.24 | 8.50 | 8.24 | 8.46 | — | 8.25 | 8.30 | 8.13 | 8.36 | 8.20 |
| | after storage | 8.22 | 8.15 | 8.40 | 8.29 | 8.35 | 8.17 | 8.17 | 8.13 | — | 8.29 | 8.07 |
| pH | after autoclaving | 7.6 | 7.6 | 7.8 | 7.9 | 7.5 | 7.4 | 7.3 | — | — | 7.1 | 7.1 |
| | after storage | 7.5 | 7.5 | 7.7 | 7.9 | 7.5 | 7.3 | 7.2 | — | — | 5.9 | 6.9 |
| osmolarity | after autoclaving | 327 | 327 | 327 | 320 | 327 | 264 | 301 | — | — | 297 | 288 |
| | after storage | 335 | 360 | 333 | 336 | 340 | 290 | 327 | — | — | 318 | 304 |

Legend to Table 1:
a) Storage: 1 week at 80° C.
b) in addition 49.8 mmol/l NaCl
c) 0.5 ml saline composition: 132.6 mmol/l NaCl; 17.1 mmol/l $Na_2HPO_4$; 5.4 mmol/l $NaH_2PO_4$
d) 5.0 ml saline composition as c)
e) without the addition of NaCl, therefore somewhat lower osmolarity after autoclaving

EXAMPLE 2

Hydrolysis of polyvinyl alcohol hydrogels having various contents of crosslinking agents In analogy to Example 1, contact lenses are produced, by photochemical crosslinking in quartz glass moulds using a medium pressure mercury lamp, from aqueous prepolymer solutions (solids content 30% by mass) having 10 mol % acetate groups based on the repeating units and 0.46 or 0.52 mmol/g acrylamide groups. The contact lenses are autoclaved in 0.5 ml of $Na_2HPO_4$ solution (135 mmol/l $Na_2HPO_4$) for 45 min. at 122° C. in a conventional PP packaging having an aluminium sealing foil. After autoclaving, the diameter and radius of curvature (base curve) of the contact lens and also the pH value and osmolarity of the autoclaving solution are determined. The contact lenses are subjected to an accelerated storage test at 80° C. (1 week). The diameter and radius of curvature (base curve) of the contact lens and also the pH value and osmolarity of the autoclaving solution are then determined again.

The results in Table 2 show that the contact lenses are storage-stable, since the changes in geometry occurring during the storage are in all cases smaller than the maximum changes in geometry allowed according to ISO standard.

TABLE 2

Hydrolysis of polyvinyl alcohol contact lenses having various contents of crosslinking agents

| acetate | [mol %] | 10 | 10 |
|---|---|---|---|
| acrylamide | [mmol/g] | 0.46 | 0.52 |
| $Na_2HPO_4$ | [mmol/l] | 135 | 135 |
| diameter | before autoclaving | 14.30 | — |
| | after autoclaving | 14.05 | 13.95 |
| | after storage | 13.98 | 13.85 |
| base curve | before autoclaving | 8.42 | — |
| | after autoclaving | 8.28 | 8.42 |
| | after storage | 8.22 | 8.32 |

TABLE 2-continued

Hydrolysis of polyvinyl alcohol contact lenses having various contents of crosslinking agents

| pH | after autoclaving | 7.6 | 7.4 |
|---|---|---|---|
|  | after storage | 7.5 | 7.2 |
| osmolarity | after autoclaving | 327 | 335 |
|  | after storage | 335 | 367 |

EXAMPLE 3

Hydrolysis of polyvinyl alcohol contact lenses in the primary packaging. Storage stability test at elevated temperatures.

In analogy to Example 1, contact lenses are produced, by photochemical crosslinking in quartz glass moulds using a medium pressure mercury lamp, from aqueous prepolymer solutions (solids content 30% by mass) having 7.5 mol % acetate groups based on the repeating units and 0.48 mmol/g acrylamide groups. The contact lenses are autoclaved in 0.65 ml of $Na_2HPO_4$ solution (80 mmol/l $Na_2HPO_4$ and 0.49 mmol/g NaCl) for 45 min. at 122° C. in a conventional PP packaging having an aluminium sealing foil. After autoclaving, the diameter and radius of curvature (base curve) of the contact lenses and also the pH value and osmolarity of the autoclaving solution are determined. The contact lenses are subjected to accelerated storage tests at 80° C. (1 week), 65° C. (10 weeks) and 45° C. (12 weeks). The diameter and radius of curvature (base curve) of the contact lens and also the pH value and osmolarity of the autoclaving solution are determined during the storage. The results in Table 3 show that the contact lenses are storage-stable, since the changes in geometry occurring during the storage are in all cases smaller than the maximum changes in geometry allowed according to ISO standard.

TABLE 3

| Measurement values | Diameter [mm] | Base curve [mm] | pH value | Osmolarity [mosmol/kg] a) |
|---|---|---|---|---|
| Storage stability of contact lenses at 45° C. / 65° C. and 80° C. The following values apply: dioptre: −6 (0.115 mm TC (thickness in the center)) in 0.55 ml of saline with 80 mmol/l disodium hydrogen phosphate ||||| 
| before autoclaving (initial value) | 14.14 | 8.37 | 9.2 | 280 |
| after autoclaving | 14.01 | 8.22 | 7.2 | 314 |
| 1 week 80° C. | 13.90 | 8.25 | 7.1 | 319 |
| 2 weeks 65° C. | 13.91 | 8.18 | 7.1 | 324 |
| 4 weeks 65° C. | 13.91 | 8.20 | 7.1 | 334 |
| 6 weeks 65° C. | 13.91 | 8.20 | 7.1 | 356 |
| 8 weeks 65° C. | 13.88 | 8.13 | 7.1 | 358 |
| 12 weeks 65° C. | 13.98 | 8.12 | 7.1 | 393 |
| 4 weeks 45° C. | 13.94 | 8.26 | 7.1 | 314 |
| 8 weeks 45° C. | 13.95 | 8.26 | 7.1 | 314 |
| 10 weeks 45° C. | 14.00 | 8.25 | 7.0 | 326 |
| Parameters: dioptre: −0.5 (0.085 mm TC) in 0.65 ml of saline with 80 mmol/l disodium hydrogen phosphate ||||| 
| before autoclaving (initial value) | 14.13 | 8.35 | 9.2 | 280 |
| after autoclaving | 13.98 | 8.26 | 7.5 | 302 |
| 1 week 80° C. | 13.93 | 8.20 | 7.3 | 324 |
| 2 weeks 65° C. | 13.90 | 8.20 | 7.4 | 313 |
| 4 weeks 65° C. | 13.90 | 8.24 | 7.4 | 344 |
| 6 weeks 65° C. | 13.90 | 8.20 | 7.4 | 356 |
| 8 weeks 65° C. | 13.89 | 8.14 | 7.4 | 350 |
| 12 weeks 65° C. | 13.98 | 8.20 | 7.4 | 357 |
| 4 weeks 45° C. | 14.00 | 8.30 | 7.3 | 309 |

TABLE 3-continued

| Measurement values | Diameter [mm] | Base curve [mm] | pH value | Osmolarity [mosmol/kg] a) |
|---|---|---|---|---|
| 8 weeks 45° C. | 13.95 | 8.20 | 7.4 | 305 |
| 12 weeks 45° C. | 13.98 | 8.22 | 7.3 | 308 | a) Increase in osmolarity at 65° C. as a result of loss of water through the polypropylene (PP) packaging

EXAMPLE 4

Hydrolysis of polyvinyl alcohol hydrogels. Comparison of the mechanical properties before and after hydrolysis.

In analogy to Example 1, small planar discs are produced, by photochemical crosslinking in quartz glass moulds using a medium pressure mercury lamp, from aqueous prepolymer solutions (solids content 30% by mass) having 7.5 mol % acetate groups (based on the repeating units) and 0.48 mmol/g acrylamide groups. The Young's modulus and compression modulus of some of the planar discs are determined. The remaining discs are autoclaved in 0.65 ml of $Na_2HPO_4$ solution (80 mmol/l $Na_2HPO_4$ and 49.8 mmol/l NaCl) for 45 min. at 122° C. After autoclaving, the Young's modulus and compression modulus are determined. The changes in compression modulus and Young's modulus before and after hydrolysis are not statistically significant.

TABLE 4

Hydrolysis of polyvinyl alcohol hydrogels having 0.48 mmol/g acrylamide and 7.5 mol % acetate. Comparison of the mechanical properties before and after hydrolysis

|  | Young's modulus | | Elongation at break | | Compression modulus 1 Hz | | tan delta (loss factor) |
|---|---|---|---|---|---|---|---|
|  | [MPa] | Std a) | [%] | Std a) | [MPa] | Std a) | 1 Hz |
| before hydrolysis | 0.62 | 0.02 | 88.4 | 8.4 | 0.385 | 0.015 | 0.33 |
| after hydrolysis | 0.58 | 0.02 | 80.5 | 4.7 | 0.36 | 0.01 | 0.32 | a) Std = standard deviation

What is claimed is:

1. A process for the preparation of storage-stable hydrogel mouldings which comprises the following steps:
   a) transferring a hydrogel moulding that contains hydrolytically removable side groups to a container,
   b) filling up the container containing the hydrogel moulding with a basic buffer solution,
   c) closing the container, and
   e) autoclaving the container containing the hydrogel moulding and the basic buffer solution at a temperature of at least 100° C.,
   wherein, during the autoclaving, the hydrolytically removable side groups are essentially completely removed, the container contents are sterilised, and the basic buffer solution is converted into a physiologically acceptable aqueous solution that is substantially isotonic and pH-compatible with the lacrimal fluid of the human eye.

2. A process according to claim 1, wherein the hydrogel moulding is derived from polyvinyl alcohol.

3. A process according to claim 1, wherein the hydrogel moulding is derived from a water-soluble and crosslinkable polyvinyl alcohol prepolymer.

4. A process according to claim 1, wherein the container is a polypropylene packaging having an aluminum sealing foil.

5. A process according to claim 1, wherein the basic buffer solution comprises buffers selected from the group consisting of monohydrogen phosphate, phosphate, borate and carbonate.

6. A process according to claim 1, wherein the basic buffer solution comprises buffers selected from the group consisting of monohydrogen phosphate and phosphate.

7. A process according to claim 1, wherein the initial pH value of the basic buffer solution is in the range from 8 to 12.

8. A process according to claim 1, wherein the temperature range in which the autoclaving is carried out is in the range from 101 to 150° C.

9. A process according to claim 1, wherein the duration of the autoclaving step is in the range from approximately 5 minutes to approximately 18 hours.

10. A process according to claim 1, wherein the hydrolytically removable side groups, which are removed during the autoclaving, do not form any toxic products.

11. A process according to claim 10, wherein non-toxic side groups are selected from the group consisting of acetate groups, propionate groups or mixtures thereof.

12. A process according to claim 1, wherein the osmolarity of the buffer solution after the autoclaving step is in the range from approximately 220 to approximately 450 mosmol.

13. A process according to claim 1, wherein the pH value after the autoclaving step is in the range of approximately from pH 6 to 8.

14. A process according to claim 3, wherein the prepolymer is a modified polyvinyl alcohol having a mean molecular weight of at least approximately 2000 which, based on the number of hydroxyl groups of the polyvinyl alcohol, contains from approximately 0.5 to approximately 80% units of formula (I)

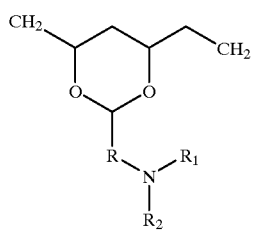

(I)

wherein R is lower alkylene having up to 8 carbon atoms, $R_1$ is hydrogen or lower alkyl and $R_2$ is an olefinically unsaturated, electron-attracting, copolymerisable radical preferably having up to 25 carbon atoms.

15. A process according to claim 14, wherein $R_2$ is an olefinically unsaturated acyl radical of the formula $R_3$—CO— and wherein $R_3$ is an olefinically unsaturated copolymerisable radical having from 2 to 24 carbon atoms.

16. A process according to claim 14, wherein the radical $R_2$ is a radical of formula II —CO—NH—(R_4—NH—COO)_q—R_5—OCO—R_3   (II)

wherein q is zero or one and $R_4$ and $R_5$ are each independently of the other lower alkylene having from 2 to 8 carbon atoms, arylene having from 6 to 12 carbon atoms, a saturated divalent cycloaliphatic group having from 6 to 10 carbon atoms, arylenealkylene or alkylenearylene having from 7 to 14 carbon atoms or arylenealkylenearylene having from 13 to 16 carbon atoms, and wherein $R_3$ is an olefinically unsaturated copolymerisable radical having from 2 to 24 carbon atoms.

17. A process according to claim 1, wherein the hydrolysis is carried out in the primary packaging of the hydrogel moulding, the hydrogel moulding simultaneously being sterilised and a physiologically acceptable salt concentration being obtained.

18. A process according to claim 1, wherein the mechanical properties of the moulding remain substantially unaltered after the autoclaving.

19. A process according to claim 2, wherein the polyvinyl alcohol is derived from 0.8 to 15 mol % of solution selected from the group consisting of a polyvinyl acetate solution, a polyvinyl propionate solution, or a mixture thereof.

20. A process according to claim 19, wherein the polyvinyl alcohol is derived from 2 to 10 mol % of solution selected from the group consisting of a polyvinyl acetate solution, a polyvinyl propionate solution, or a mixture thereof.

21. A process according to claim 20, wherein the polyvinyl alcohol is derived from 5 to 10 mol % of solution selected from the group consisting of a polyvinyl acetate solution, a polyvinyl propionate solution, or a mixture thereof.

22. A process according to claim 7, wherein the initial pH value of the basic buffer solution is in the range from 8.5 to 11.

23. A process according to claim 22, wherein the initial pH value of the basic buffer solution is in the range from 9 to 10.

24. A process according to claim 8, wherein the temperature range in which the autoclaving is carried out is in the range from 110 to 130° C.

25. A process according to claim 24, wherein the temperature range in which the autoclaving is carried out is in the range from 115 to 125° C.

26. A process according to claim 9, wherein the duration of the autoclaving step is in the range from approximately 15 minutes to approximately 8 hours.

27. A process according to claim 26, wherein the duration of the autoclaving step is in the range from approximately 20 minutes to approximately 120 minutes.

28. A process according to claim 13, wherein the osmolarity of the buffer solution after the autoclaving step is in the range from approximately 250 to approximately 400 mosmol.

29. A process according to claim 28, wherein the osmolarity of the buffer solution after the autoclaving step is in the range from approximately 280 to approximately 400 mosmol.

30. A process according to claim 13, wherein the pH value of the buffer solution after the autoclaving step is in the range of approximately 6.8 to 7.6.

31. A process according to claim 15, wherein $R_3$ is an olefinically unsaturated copolymerisable radical having from 2 to 8 carbon atoms.

32. A process according to claim 31, wherein $R_3$ is an olefinically unsaturated copolymerisable radical having from 2 to 4 carbon atoms.

33. A process according to claim 16, wherein $R_3$ is an olefinically unsaturated copolymerisable radical having from 2 to 8 carbon atoms.

34. A process according to claim 33, wherein $R_3$ is an olefinically unsaturated copolymerisable radical having from 2 to 4 carbon atoms.

35. A process according to claim 1, wherein said moulding is a contact lens.

* * * * *